United States Patent
Cosimano

(10) Patent No.: US 7,748,127 B1
(45) Date of Patent: Jul. 6, 2010

(54) LIGHT FIXTURE ALIGNMENT TOOL

(76) Inventor: Harry Cosimano, 10 Harmony Brass Castle Rd., Phillipsburg, NJ (US) 08865-9300

( * ) Notice: Subject to any disclaimer, the term of this patent is extended or adjusted under 35 U.S.C. 154(b) by 133 days.

(21) Appl. No.: 12/220,008

(22) Filed: Jul. 21, 2008

(51) Int. Cl.
*G01C 15/00* (2006.01)
*G01D 21/00* (2006.01)

(52) U.S. Cl. .................................. 33/286; 33/DIG. 21

(58) Field of Classification Search .................. 33/286, 33/DIG. 21, 528, 613, 645, 263; 362/145, 362/147
See application file for complete search history.

(56) References Cited

U.S. PATENT DOCUMENTS

| | | | |
|---|---|---|---|
| 5,644,850 A * | 7/1997 | Costales | 33/282 |
| 6,101,728 A * | 8/2000 | Keng | 33/283 |
| 6,371,626 B1 * | 4/2002 | Addona | 33/DIG. 21 |
| 6,594,910 B2 * | 7/2003 | Wishart | 33/286 |
| 6,609,307 B1 * | 8/2003 | Haynes et al. | 33/286 |
| 6,718,644 B1 * | 4/2004 | Perkins et al. | 33/286 |
| 6,986,209 B2 * | 1/2006 | Cook | 33/286 |
| 7,331,113 B1 * | 2/2008 | Patrick et al. | 33/286 |
| 7,464,478 B2 * | 12/2008 | Adrian | 33/286 |
| 7,600,901 B2 * | 10/2009 | Gordin et al. | 33/286 |
| 2007/0258252 A1 * | 11/2007 | Matts et al. | 362/418 |

* cited by examiner

*Primary Examiner*—Yaritza Guadalupe-McCall
(74) *Attorney, Agent, or Firm*—Charles A. Wilkinson; Clinton H. Wilkinson

(57) ABSTRACT

An apparatus and method for aiming and aligning a light wherein a laser light source is mounted in an electrically non-conductive housing having a socket engaging section enabling the apparatus to be mounted in the socket of a light fixture to be aligned, wherein by adjusting the light fixture so that the beam emitted from said laser light source is directed at the desired aiming position for the light, the proper horizontal and vertical position for the light fixture can be quickly and accurately determined.

20 Claims, 5 Drawing Sheets

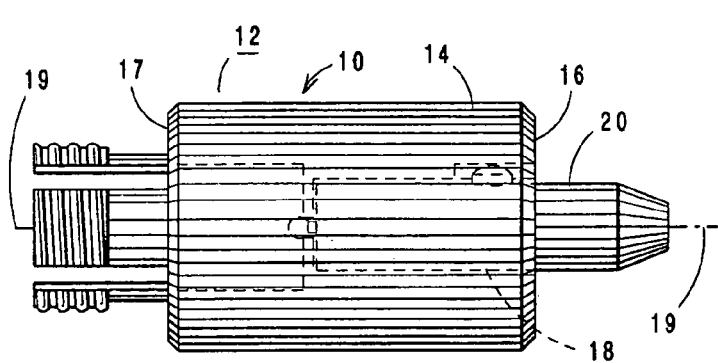
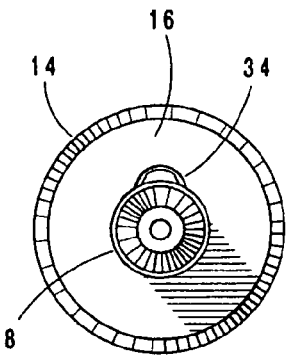
Fig. 1  Fig 2
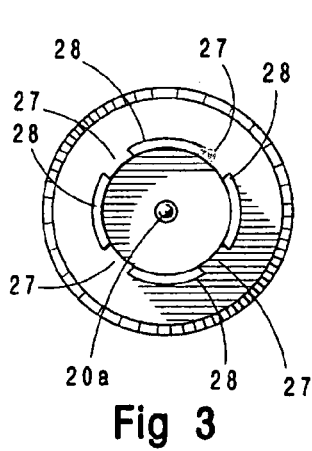
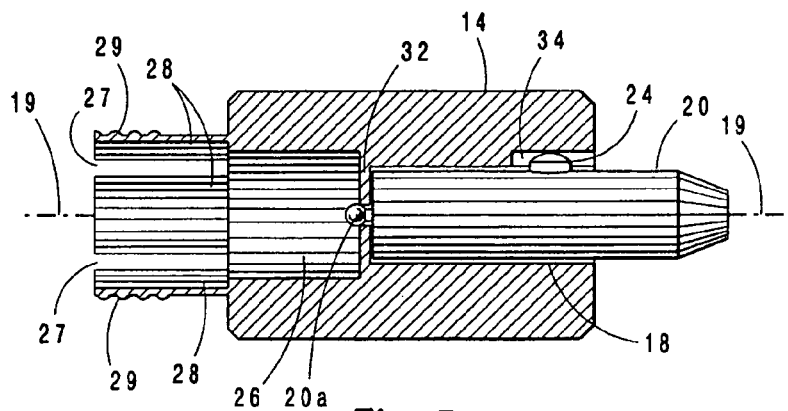
Fig 3  Fig 5
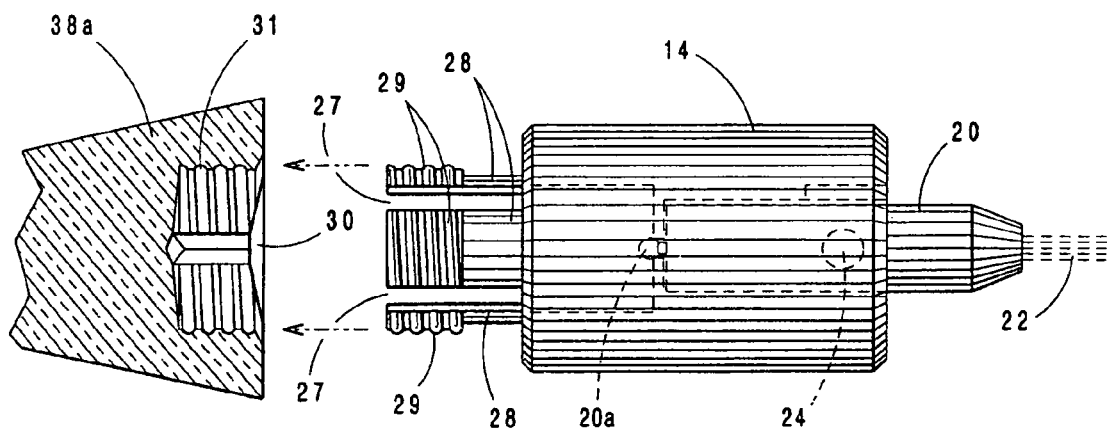
Fig 4

LIGHT FIXTURE ALIGNMENT TOOL

BACKGROUND OF THE INVENTION

1. Field of the Invention

The present invention relates to devices for properly aligning a luminarie such as a spotlight, floodlight, track lighting, and the like, and more particularly to a laser light alignment tool that directs a concentrated light beam at the desired lighting location to enable alignment of a luminarie to be determined.

2. Description of Related Art

It is of course well known to mount luminaires such as floodlights and spotlights to the walls of a building, light standards, posts, ceiling, wall mounts, or the like, in both internal or indoor and external, or outdoor areas. Floodlights produce a broader light beam and are used to saturate a relatively large area with light, while spotlights direct a more narrow beam of light at a specific object or site, with reflectors in the light fixture being used to collimate the light beam into substantially parallel rays. Such interior and exterior lighting is routinely provided both for practical safety and security purposes and for decorative purposes. For example, floodlights, with or without motion sensors, may be mounted outside one's home in dark areas to discourage intruders, or along walkways to guard against accidental tripping and falling. Overhead floodlight are typically mounted at a height of about nine feet or more to discourage tampering as well as to illuminate a larger area. Two floodlights adjustably mounted to a single base may be used to provide an even wider degree of coverage, with the base containing any necessary ballast capacitor or other components for both lights, and with socket housings for the lights adjustably mounted to the base using a horizontal swivel joint and either separate or combined vertical pivot joint arrangements or the like so that the socket housings can be rotated within a range of motion in both a horizontal and vertical plane. Often, numerous powerful floodlights may be strategically positioned and aligned to cumulatively illuminate an even larger area, such as a parking lot, a sports field, the interior of a warehouse, and many other areas. In addition to improving safety and security, lighting is also commonly used for decorative purposes, both indoors and outdoors. For example, a combination of spotlights and floodlights and other low voltage lighting may illuminate certain features of a landscape or garden, or highlight particular architectural features of a building. Track lighting systems are also very popular for interior lighting and decorating. A directed light beam may, for example, be directed from a light fixture close to the ceiling of a room or anywhere else in a room toward a treasured ornament or memento upon a mantle or a unit of furniture to illuminate or spotlight a particular ornament or the like or a spotlight may be used to illuminate a particular portion of a stairway or the like.

With increased practical and decorative applications for electric lighting, more time and effort is being spent adjusting and aligning the light housings so that the lights are directed at exact preselected points or locations. After a luminaire is properly mounted, the angle or direction the light housing is facing or directed to must be adjusted manually several times until it is aligned properly. This customarily requires at least two persons working together, one on a ladder or the like to manually adjust the angle of the light housing and direction of the light beam, and the other on the ground assisting such person in aiming the light. Alternatively, one person alone may climb up and down a ladder several times while adjusting the angle and direction of the light housing and then checking to see if the light is correctly positioned. This can be inconvenient and time-consuming, however, particularly if several or even a large number of lights must be properly aimed, or if the position of such lights must be adjusted periodically. Often, it is visually difficult to determine if a light is correctly aligned, due to the brightness of the light and angle at which it is being viewed, and the correct position may never be achieved. On the other hand, if such lights are not properly aligned their practical or decorative effectiveness and desirability may be significantly diminished.

Numerous devices and aids for aiming and adjusting the direction of a light source are found in the prior art. It is also known to use laser pointing devices for a wide range of purposes including as an alignment aid, but not to align a light quickly and accurately in the same manner as in the present invention. The most relevant-appearing prior art references known to the present inventor are discussed below.

U.S. Pat. No. 4,160,285 issued to J. N. Shibla on Jul. 3, 1979, entitled "Point Locating Apparatus," discloses a device for locating a previously located point, such as a ground oil fill pipe, on a reoccurring basis. A support bracket for a laser light is mounted to a nearby support wall and is adjusted so as to direct a laser light at a precise location, and the bracket is secured in such position. The laser light is removed from the bracket until a later date, at which later date the laser light is placed back in the bracket and turned on to point to the proper location. Shibla does not disclose the use of a laser light to properly align the direction of another light source, however.

U.S. Pat. No. 4,339,789 issued to D. E. Husby et al. on Jul. 13, 1982, entitled, "Flood Light Aiming Method," discloses a method for properly aiming a flood light, whereby in one embodiment a laser light device is temporarily mounted on the outer surface of the housing for such light, with the laser light emitted in parallel with the beam emitted from the luminaire light source. The laser light is then used as a guide to visually align the luminaire light, with the laser light being aimed at a "pie plate" or reflecting member positioned adjacent such desired location, after which the light housing is secured in the proper position and the laser light device removed. Unlike the present inventor's arrangement, in Husby's method a user must first make sure that that laser light is mounted in parallel with the beam emitted by the light source, which can be difficult and is likely to be a time consuming and error prone process, while in the present inventor's arrangement, such alignment is achieved automatically. In an alternative method, which is also more complicated that the present inventor's arrangement, a mirror is placed over the lens of the light being aligned, and a laser light situated near the desired position at which the light is to be aimed is directed at the mirror and reflected such that the proper alignment of the light can be determined.

U.S. Pat. No. 5,738,595 issued to W. P. Carney on Apr. 14, 1998, entitled "Laser Aiming Device," discloses a universal adapter for affixing a hand held laser pointer to multiple unrelated apparatus. Such adapter, however, is not securable in a light housing socket for aiming a light source as in the present invention.

U.S. Pat. No. 5,907,648 issued to J. V. Miller et al. on May 25, 1999, entitled "Aimable-Beam Fiber-Optic Spotlight Luminaire", discloses an aimable fiber-optic spotlight light mounted in a tubular housing and having a lens mounted on the distal end of the housing. A fiber-optic light is directed at the lens, and a light guide is used to adjust or shift the direction of the light beam without moving the housing, and thus the housing can be recessed into a surface without leaving room for adjustent. While numerous other arrangements for aiming spotlights and the like are found in the prior art, an apparatus for ensuring that a light is properly aimed at a preselected position similar to the present invention is not known.

U.S. Pat. No. 6,286,219 issued to C. E. Palumbo, II on Sep. 11, 2001, entitled "Laser Alignment Method and Apparatus," discloses a laser aiming device which is mounted in the end of a conduit pipe and provides a center reference point to facilitate installing pipes where straight line assembly is fairly critical, such as in installing building sprinkler systems. The laser pointer is secured in a central aperture in a cap member, which cap is threadably secured in or mountably secured over the end of a pipe with the laser light beam projecting outwardly.

U.S. Pat. No. 6,643,019 issued to J. D. Jeanneret on Nov. 4, 2003, entitled "Laser Alignment Device," discloses another laser alignment tool that can be secured to a surface by a screw or the like, or fitted over the end of a pipe. Such device includes a first pipe cap to which the laser is mounted, and a second pipe cap that is detachably secured to the first pipe cap via a reducer sleeve arrangement. While apparently a simple and easy to use alignment tool for its particular purposes, use as an aid for aiming a floodlight, spotlight, or the like is not disclosed.

U.S. Pat. No. 6,648,709 issued to B. R. Teichgraeber et al. on Nov. 18, 2003, entitled "Reflector Alignment Tool for Projection Illumination Systems," discloses a tool for aligning projector optics having a cathode portion that fits in the cathode socket of a projector lamp, an anode portion which fits in the anode socket, and a light source such as a flashlight positioned between the cathode and anode portions to approximate the arc position of a lamp fitted in the cathode and anode sockets. The anode and cathode portions are connected by at least two rods, and the device is arranged so that when the shadows cast by the rods are equal, the device is properly aligned.

U.S. Pat. No. 6,715,904 issued to M. L. Naughton on Apr. 6, 2004, entitled "Laser Light Handle," discloses a handle for a surgical lamp including a laser light that is used to position or align the surgical light beam. The handle of a typical surgical lamp is positioned centrally in the light path and is grasped to adjust the position of the light housing, which is mounted to a wall or support by an adjustable bracket. In Naughton the laser light remains in the handle during use of the surgical lamp, while in the present invention the laser light mounting is used only to align a light fixture housing, after which it is removed from the socket and replaced by the light source.

U.S. Pat. No. 6,718,644 issued to T. Perkins et al. on Apr. 13, 2004, entitled "System for Aligning a Hub/Mask with a Soffit Penetration Point and Method of Using Same," discloses an alignment device for aligning a drilled orifice into the soffit of a building above the hub or opening in a power meter installation in which a threaded retainer or holder is rotated into a hub or opening in the meter, a laser is inserted into the holder and a hole drilled at the impingement point of the laser beam on the soffit for entrance of service to the building.

U.S. Pat. No. 6,746,336 issued to K. J. Brant et al. on Jun. 8, 2004, entitled "Pool Cue Alignment and Training Apparatus," discloses a pool stick having a laser light in the tip to aid players in lining up shots. The laser light is used in combination with a reflector system situated along the side rails of a pool table so that the light emitted by the laser light reflects off such reflectors and can be used to line up bank shots off the side rails. While Brant thus illustrates another use of a laser light for alignment purposes, the laser light device is not used as an aid for aligning a primary light source.

U.S. Pat. No. 6,946,973 issued to L. M. Yanda on Sep. 20, 2005, entitled "Precision Parking Device," discloses the use of a laser light as a parking assist device in a garage having an automatic door opener, whereby the laser light is activated to indicate when a vehicle is properly positioned in the garage. While laser light may be electrically connected to the socket base for the main light of the garage door opener system, such laser light is not physically mounted in the light socket.

U.S. Pat. Pub. No. 2001/0034944 issued to C. L. Cunningham on Nov. 1, 2001, entitled "Laser Leveler," discloses a laser alignment tool having a base for detachably mounting to a water pipe or the like by magnets. When mounted and turned on, the laser light is aimed at a position where a drill hole for attaching a bracket or the like is to be drilled, or to aid in placing a pipe or conduit bend. An air bubble type level is also included.

According to the above references, it is known to utilize a laser light as an alignment aid in various circumstances, including, as shown in U.S. Pat. No. 4,339,789 issued to Husby et al., to aid in correctly aiming a flood light. In Husby et al., however, the laser light is mounted on the outer surface of the light housing, rather than in the light socket. In addition, none of the other prior art references known to the present inventor teach the temporary insertion of a laser light in the light socket of a spotlight or floodlight luminaire during adjustment of the light housing, with the housing for the laser light being made from an electrically non-conductive material. In addition, while U.S. Pat. No. 4,160,285 issued to Shibla teaches the use of a laser light to point to a specific location, such reference also does not teach the temporary mounting of a laser light aiming device in a light socket to aid in aiming a floodlight or spotlight type luminaire.

Thus, while the prior art devices discussed above are useful for their own particular indicated purposes and uses, none exhibits the particular features of the present inventor's luminaire alignment aid apparatus that make such apparatus significantly easier and less time-consuming to use. The present apparatus is mounted in the light socket of a luminaire to be aimed in a particular direction or towards a preselected spot by pressing the prongs of the base or housing into the socket. The laser pointer device is then turned on, after which the housing can be directed so that the laser light is pointed at the desired location, or the midpoint of such location. The housing is then secured in such position, after which the alignment apparatus is removed from the light socket and replaced with a suitable light source, which when turned on or activated will already be aimed at the desired location.

OBJECTS OF THE INVENTION

It is therefore a primary object of the present invention to provide a luminaire alignment aid apparatus that is simple in design and may be used to quickly, easily and precisely align spotlights, floodlights, and the like at or toward a desired horizontal and vertical point or location.

It is a further object of the present invention to provide a high intensity confined beam light which can be entered into a directional light source in place of a normal bulb of such directional light source and aid when electrically activated to align the directional light source.

It is a still further object of the present invention to temporarily mount the confined beam light in the normal socket of the directional light source.

It is a still further object of the present invention to mount a confined light in the normal light socket of a directional light by means of a quick connect.

It is a still further object of the present invention to provide a method of expeditiously aiming a directional light having an adjustable mounting by removing any light bulb in the directional light, temporarily replacing such light bulb in the directional light with a laser light fitting adapted for electrical or non electrical connection with the socket, activating the laser light, and aiming the light fixture while the laser light is activated so that the laser light is pointing in the desired direction, after which the laser light may be replaced by the normal light bulb which will be correctly oriented for best illumination.

It is a still further object of the present invention to provide a light fixture alignment aid apparatus comprised of a laser light source that is mountable in an electrically non-conductive body section, which apparatus is then temporarily secured in a bulb socket of a luminaire to be aligned, such that when the laser light source is activated, the position of the beam emitted from said laser light source is indicative of the horizontal and vertical position of said bulb socket, which position can then be adjusted manually to a desired position while the laser light is activated by directing the laser light at a desired location.

It is a still further object of the present invention to provide a light fixture alignment aid apparatus wherein the device body is made from an electrically non-conductive material having a laser light device connected thereto and at least two flexible prongs which when inserted into a bulb socket are moved flexibly inwardly towards one another, and once inserted press against the side walls of said socket to hold the device in place.

It is a still further object of the present invention to provide a method of quickly and easily aligning a light source so that the light is emitted in a preselected direction.

It is a still further object of the present invention to provide a high intensity confined beam light in the form of a laser light having an electrical socket connection at the end adapted for connection into the bulb socket of a directional light temporarily in order to aim the directional light.

It is a still further object of the invention to supply a laser light in a socket fitting which can be inserted into the normal threads of a light fixture provided for the electric bulb of a luminaire-type lighting fixture so as to provide an alignable light beam directed at or toward the precise area to be illuminated.

It is a still further object of the invention to supply a laser light in a socket fitting in two principal embodiments, one of which threads into a normal light bulb socket by threading into a socket temporarily replacing the normal luminaire bulb and the other of which can be temporarily mounted in a luminaire socket by being slid directly into the socket remaining securely in the socket until its contacts are compressed for sliding withdrawal.

It is a still further object of the invention to provide a high intensity confined beam light having a casing including an electrical socket connector for entering temporarily into an adjustable electrical socket in which the electrical socket connection is formed substantially wholly of non-conductive material.

It is a still further object of the invention to provide a high intensity confined beam light temporarily mountable in a light socket to provide a narrow beam of high intensity light toward the area to be illuminated with a switch operating the narrow beam high intensity light being operable by rotation of a portion of the outer casing for the light and incorporating a safety interlock preventing the high intensity light from being activated by rotation of such light casing in the direction usually used for unscrewing of a bulb from an electric socket.

Still other objects and advantages of the invention will become clear upon review of the following detailed description in conjunction with the appended drawings.

SUMMARY OF THE INVENTION

An apparatus for quickly and accurately aiming and aligning commercial or household directional lights or luminaires such as floodlights, track lighting, spotlights and the like, which tool utilizes a conventional battery operated laser light source that is secured in an opening in one end of an electrically non-conductive housing. Situated on the opposite end of said housing is a socket engaging member for connecting the apparatus in a bulb socket of a light fixture to be aligned. The socket engaging member in a preferred embodiment is comprised of a plurality of spaced apart flexible prongs dimensioned to fit in a bulb socket, and wherein when pressed downwardly or inwardly into the socket the prongs are moved inwardly toward one another. The operation or activation of the laser pointer is controlled by rotating it either directly or by means of a tight fitting in the socket housing, whereby a switch on the side of the laser light is moved in and out of a detent in the side surface of the socket opening, causing the switch to turn the device off and on. Once secured in the socket, the longitudinal axis of the tool and laser pointer correspond with the longitudinal axis of the socket, so that by adjusting the horizontal and vertical position of the light base, the light can be precisely aimed at a desired point or area. The alignment tool is then pulled out of or otherwise removed from the socket and the standard bulb inserted, with the device already being properly directionally aligned to illuminate such desired point or area. In an alternative embodiment, the laser pointer housing is rotated into and out of the electric socket by means of a more or less conventional threaded fitting. In a preferred embodiment of the invention, a cap or outer shroud may be mounted on the outer end of the laser pointer to protect the laser light and serve as a means to turn the light on and off. In a still further preferred embodiment, this outer cap or shroud is arranged to only turn with respect to the casing in a clockwise direction.

BRIEF DESCRIPTION OF THE DRAWINGS

FIG. 1 is a side view of the light fixture alignment aid apparatus of the present invention.

FIG. 2 is a front view of the light fixture alignment aid apparatus.

FIG. 3 is a rear view of the light fixture alignment aid apparatus.

FIG. 4 is a side view illustrating the placement or mounting of the light fixture alignment aid apparatus in a bulb socket.

FIG. 5 is a cross-section of the light fixture alignment aid apparatus of the invention.

DESCRIPTION OF THE PREFERRED EMBODIMENTS

Figure 6:
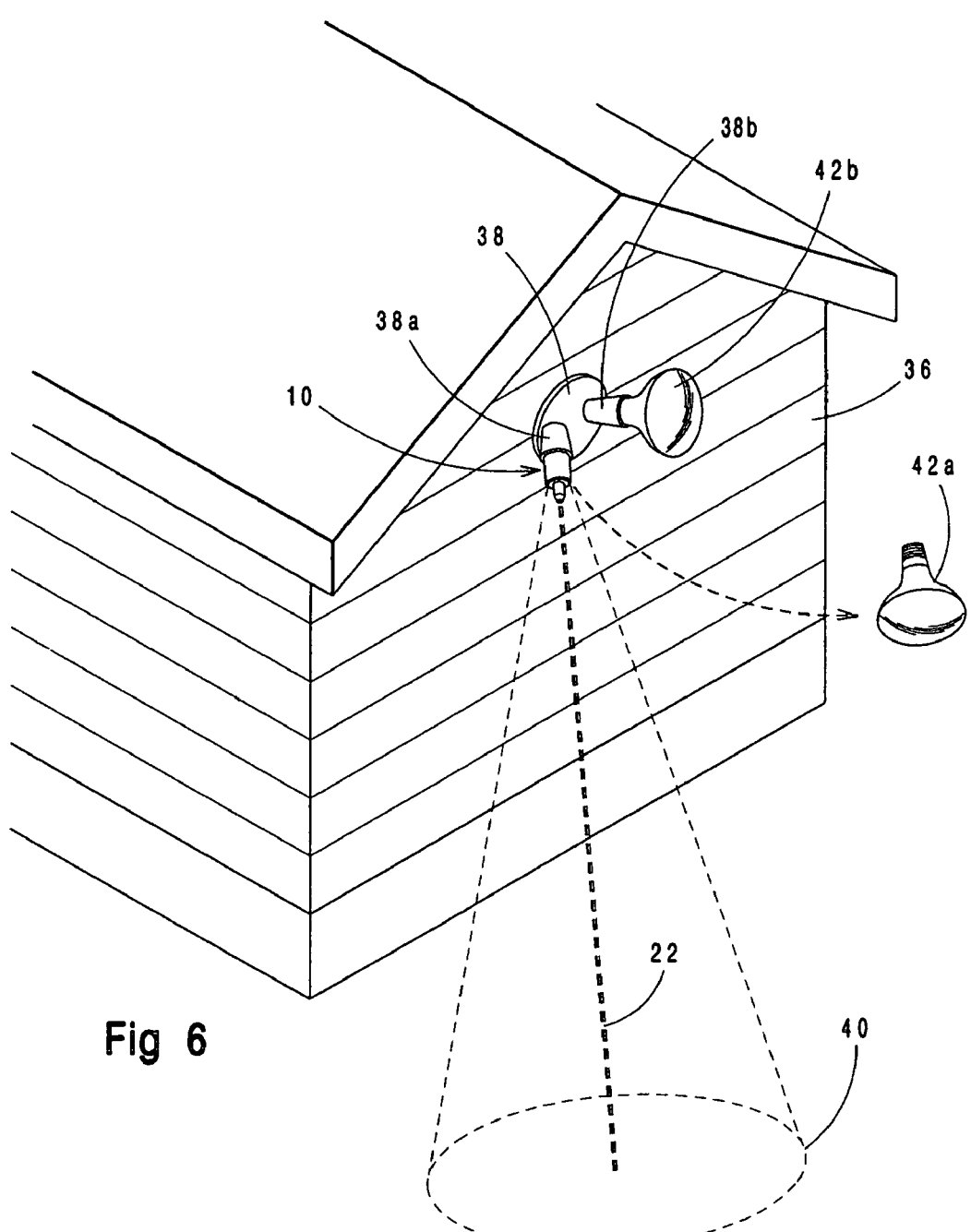
FIG. 6 illustrates the method of using the light fixture alignment aid apparatus to align a socket housing for a light fixture.

The following detailed description is of the best mode or modes of the invention presently contemplated. Such description is not intended to be understood in a limiting sense, but to be an example of the invention presented solely for illustration thereof, and by reference to which in connection with the following description and the accompanying drawings one skilled in the art may be advised of the advantages and construction of the invention.

As indicated and reviewed above, there have been a number of laser light aligning devices devised and used in the past. However, none have been completely suitable for aligning directional lights around the home or business in a simple and convenient manner. The present inventor has unexpectedly realized that such a simple and effective laser light alignment apparatus can be provided by the user of a laser apparatus with a constricted beam of light for mounting temporarily directly in the light socket of a directed light to be aligned. Such laser alignment apparatus can then be merely placed within the socket of the light and the light or light socket, with the activated laser light device replacing the normal incandescent or other bulb, adjusted until the laser beam is centered upon the portion of a surface toward which the directional lighting is to be directed, after which the laser device can be removed from the socket and the normal light bulb replaced, whereupon the adjustment of the directional lighting will have been completed.

The present inventor has, furthermore, developed a particularly safe and practical apparatus for providing a laser alignment light in a form which makes use of a novel holder for containing a standard battery powered laser light suitable for use in the alignment of lamps, the holder having a screw threaded fitting on the opposite end from a retainer for the laser light, which screw threaded fitting is preferably made non-conducting for safety and enters into the screw-type lamp socket securely so the laser light is held in a position to project a beam of laser light directly at a spot straight ahead of the light on the surface to be illuminated. The point of illumination can then be adjusted by moving the light socket until the requisite illumination is directed straight at the area to be illuminated and thereby provide orientation of the light socket. The laser light contained in the fitting of the invention can thus be used as a guide to move the light fixture which it is desired to operate into proper position to illuminate the particular area desired.

FIGS. 1-5 illustrate the light alignment aid apparatus 10 of the present invention and system for using such apparatus. Apparatus 10 is comprised of a body member 12 having a main housing section 14 which is generally cylindrical in shape and has a forward end 16 and a rearward end 17, a laser light emitting device or so-called laser pointer 20, and socket engaging prongs 28, see FIGS. 3, 4 and 5. Body member 12 is made from an electrically non-conductive or insulator material such as a ceramic material or suitable plastic resin, such as polyvinyl chloride, or other suitable insulator material appropriate for the amount of voltage applied to the light circuit, of which there are many structural insulator materials known to those skilled in the art. The shape of main housing section 14 is not critical to the invention and could vary significantly, although a rounded surface is preferred as it is believed this gives the housing a smoother and more even appearance, and is similar to or matches the shape of most conventional light housings. An opening 18 is provided in forward end 16 of main housing section 14 of body member 12 along the longitudinal axis 19 of main housing section 14, in which opening 18 laser light emitting device 20 or Laser LED is receivable such that a laser beam 22, see FIG. 4, emitted by such device extends forwardly from the front of the light emitting device contained in body member 12 along the longitudinal axis 19 of both the laser device and the main housing section 14. Laser device 20 is preferably of a type and design well known in the prior art that is battery operated and wherein the laser light is activated and deactivated using a conventional button switch 24 situated on the side surface of the laser device. A recessed orifice 34 is provided on the inner surface of opening 18 in main body member 14 in which recess button-type switch 24 is inserted when the laser device 20 or pointer is placed in opening 18 of the main housing section 14. Such a laser device 20 is described as a compact laser pointer and/or may be purchased from Limate Tech Co LTD in Taipei City, Taiwan (R.O.C.). These laser pointers operate with a wavelength of 650 nm., or nanometer, power being derived usually from two small batteries and have length dimensions of 60 mm. and a diameter of 13 mm. and are supplied with a small pierced ball on the rear end to receive a lanyard or the like. Any similar laser pointer or other laser device may be used with appropriate changes in the body member 12 to adequately contain as well as retain such laser pointer. Such pierced ball is indicated in the appended figures as 20a and is conveniently used in the embodiment shown as a compression-type retainer to retain the laser device 20 within the opening or socket 18 of the main housing 14.

Flexible socket engaging prongs 28 extend outwardly from rearward end 17 of main housing section 14, which prongs 28, as shown in FIG. 3, are arranged in a generally circular pattern, with spaces 27 between adjacent prongs 28 so that such prongs can be moved flexibly inwardly toward each other. While device 10 as shown in the figures includes four flexible prongs 28, a greater or lesser number of prongs 28 such as three or five having slightly different dimensions could also be utilized. The prongs 28 have matching male threads 29 on their outer surface which, when the prongs are inserted into a bulb socket 30 having female threads 31 as shown by the arrows in FIG. 4, are engaged with such female threads 31 and are held in position in bulb socket 30 similar to the retention of a conventional light bulb. Prongs 28 are preferably made from the same electrically non-conductive material as main body section 14 of the housing, since their function is not to conduct electricity but merely to provide a temporary but secure connection with the threads of the socket aligned with the physical direction of the orientation of the socket in the same manner as a bulb screwed into the socket. The outer diameter of the prongs is slightly greater than the inner diameter of the bulb socket of the light fixture to be aligned using apparatus 10, and, of course, may be constructed in several sizes to fit whatever bulb socket size it is to be used in. A kit of different socket sizes to be used with a single laser aligner in accordance with the invention may be used. However, most directional lighting is provided with similar or standard bulb sizes, so it may be more efficient to merely purchase a different laser alignment apparatus if different bulb adapters are necessary.

In order to conveniently hold the laser pointer 20 in the body member 12 such body member 12 is, in the particular embodiment shown, provided with two internal openings, or orifices, the forward one 18 being adapted to form a fairly close fit about the laser pointer to be inserted therein and the rearward 26 opening or orifice being mostly to provide weight reduction and balance for ease of handling pursuant to placing in a light socket replacing a normal incandescent or other bulb, the two chambers being separated by a fairly narrow or thin partition 32 between the two openings 18 and 26, which partition is pierced by a small or restricted diameter orifice 33 having a diameter of somewhat lesser dimensions than the small pierced ball 20a on the rear of the laser pointer 20. Consequently, when the laser pointer 20 is pressed rearwardly in the orifice or opening 18 in body member 12 such ball 20a will be forced through the somewhat flexible orifice 33 in the thin somewhat flexible partition 32, retaining the entire laser pointer in position in the main body housing 14. In other words, the laser light apparatus will tend to be retained in its position in the opening 18 in body member 12 by a snap action of the partition 32 material about the ball on the rear of the light casing. As will be readily evident, any other simple convenient means for wedging or otherwise holding the laser light within the receiving socket may be used.

When the laser pointer apparatus is first placed in the main housing, the push button activation switch 24 will fit into a notch 34 in the side of the opening 18 in the main housing section 14. The laser will then be off. However, if the laser pointer 20 is rotated about its axis moving the push button to the side beyond the notch 34, it will be depressed by the side wall of the chamber 18 and the laser light activated. See in this regard FIGS. 4 and 11 which show in dashed lines the laser pointer rotated so the button switch 24 is depressed and the laser pointer activated. It will in general be found that the laser light housing of the invention should be made of a slightly resilient plastic composition such as a suitable polyvinyl chloride or the like which is an effective electrical insulator. The flexibility or resiliency of the polymer used should be suitable for both allowing the rear ball on the laser pointer to be pressed or forced through the orifice 33 within the thin dividing wall or partition 32 and to retain it therein, or therebehind, and also such as to provide sufficient resiliency so the prongs 28 formed of the same polymer on the end of the housing can be pushed directly into a light socket.

The simple design of apparatus 10 makes it quick and easy to use in properly aligning a lighting fixture. First, as shown in FIG. 6, a luminaire such as light fixture 38 having in the instance shown, two horizontally and vertically adjustable lamp sockets 38a and 38b are mounted to a structure such as the side of building 36, or the fixture 38 may be an already existing fixture. In such FIG. 6, it is desired that the lamp inserted in lamp socket 38a illuminate a particular ground area 40. The lamp 42a in lamp socket 38a is removed and alignment device 10 is inserted in socket 38a, as shown in FIG. 4, by pushing prongs 28 into socket 38a of light fixture 38, as shown in FIG. 6 whereby the prongs 28 will be pressed together by the ridges 29 of the male threads contacting the ridges of the female threads 31. Once inserted fully and released by the ridges of the male threads interengaging with the depressions of the female threads, the prongs 28 will press outwardly against the socket 30 and hold device 10 in the socket, with male threads 29 on the outer surface of the prongs 28 engaging with female threads 31 in the socket 38a which female threads 31 are connected in the electrical circuit, not shown. Alternatively, the prongs 28 could be inserted in socket 30 by rotating male threads 29 into female threads 31, which would also cause the prongs 28 to press inwardly, although to a lesser degree. However, simply pushing the prongs into the socket enables the alignment device of the invention to be more rapidly inserted and still accurately aligned in the socket. Some users may feel more secure or certain of having the laser properly aligned if they screw the fitting of the invention into the socket, at least initially, although if there are a number of directed or aimable lights to be adjusted, considerable time can be saved by merely sliding the male threads 29 into the socket until the ends of the prongs 28 seat on the bottom of the socket. Once inserted, the longitudinal axis 19 of device 10 is aligned or corresponds with the longitudinal axis of the socket housing. As a result, since the longitudinal axis of device 10 corresponds with the direction of laser light ray or beam 22, socket housing 32a can be precisely aligned using the laser light beam as a guide. After seating of the laser light pointer holder in the light socket the laser light emitting device 20 is then turned on so that the laser light 22 pinpoints the center of a later light beam making the desired spot on the ground visible. The laser light is activated in the embodiment shown by rotating the laser device 20 until, as shown in FIG. 1, button switch 24 is moved out of notch or detent 34 in the side of opening 18 and is pressed inwardly by or against the side surface or wall of opening 18. See FIGS. 4 and 11. The position of socket housing 38a is then manually turned or maneuvered until the laser light 22 is directed or pointing to the desired location, which in FIG. 6 is the center or midpoint of ground area 40, indicated by the circle 40. After the socket 38a has been adjusted to the proper horizontal and vertical position, if necessary it is secured in such position or otherwise left in such position. Device 10 is then removed from socket 38a and replaced with a suitable lamp or bulb 42a or with some other suitable lamp or luminaire 42, which will then itself already be properly aligned.

Figure 7:
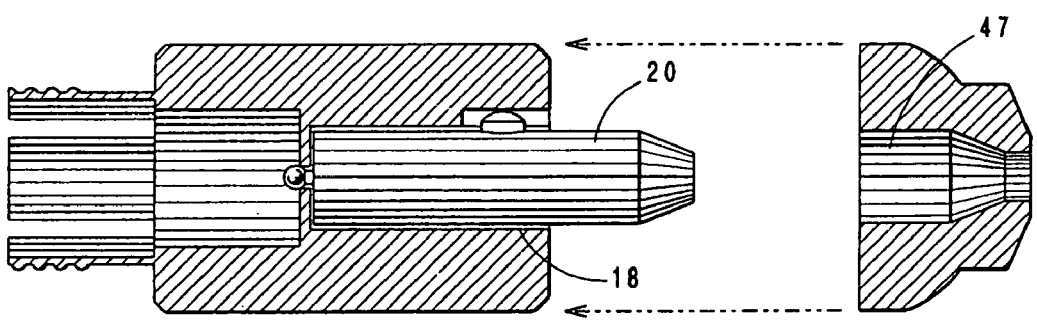
FIG. 7 is a cross-section of a preferred embodiment of the light fixture alignment aid apparatus of the invention incorporating a front shroud on the light fixture alignment aid apparatus.
Figure 8:
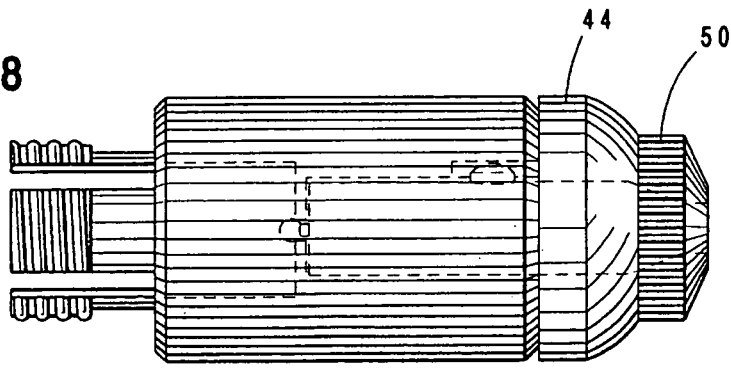
FIG. 8 is a side view of the embodiment of the apparatus shown in FIG. 7 with the front shroud in place.

FIGS. 7 through 10 show two improved arrangements for the laser pointer holder or mounting for the laser pointer in accordance with the present invention. FIGS. 7 and 8 are essentially similar to FIGS. 1 through 6 with the addition of a forward shroud or cover member 44 which fits tightly over the forward end of the laser pointer 20 as illustrated in the two FIGS. 7 and 8. Shroud 44 is designed to provide a tight fit over the laser pointer 20 such that a gripping relationship is established therewith and has an internal shape complementing the external dimensions of the front external portion of the laser pointer 20 structure. The fit between the internal surface 47 of the shroud and the external surface of the laser pointer 20 is sufficiently close or restricted, i.e. tight, so that when shroud 44 is turned or rotated, usually by gripping the grooved or knurled surface 50 about the outer end of the shroud, that the laser pointer will be rotated within the relatively larger diameter internal chamber 18 of the body member or housing 14. In the meantime, the rear bulbous extension 20a at the back of the laser pointer 20 interacting with or by being partially or completely thrust through orifice 33 in the partition 32 between the two chambers in the main body member 14 of the light fixture alignment apparatus of the invention serves to hold the laser pointer 20 within the forward cavity 18 in intimate relationship with the main body portion, but allows it to be rotated with respect thereto. Furthermore, the tight fit of the shroud 44 over the end of the laser pointer is sufficient to rotate the entire laser pointer 20 in the relatively snug, but free rotational relationship within the opening 18 in the main body member so that the laser pointer apparatus can be rotated in the internal chamber opening 18 to bring button switch 24 either into the notch 34, in which case such button switch 24 will be released and the laser turned off, or, alternatively, will rotate the button switch 24 away from the notch 34, in which case the button switch 24 will be depressed and the laser pointer apparatus or light will be activated. Otherwise, the embodiment shown in FIGS. 7 and 8 is essentially the same as that shown in FIGS. 1 through 5.

Figure 9:
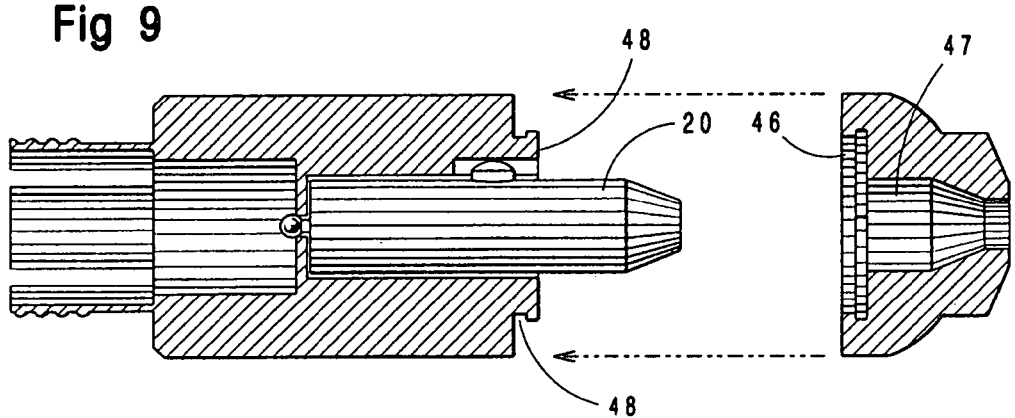
FIG. 9 is a cross-section of a less preferred embodiment of the invention similar to that shown in FIG. 7, but having a unitary threaded connection end which can only be screwed into a light socket, but also having a snap type securing arrangement for the front shroud on the body of the housing.
Figure 10:
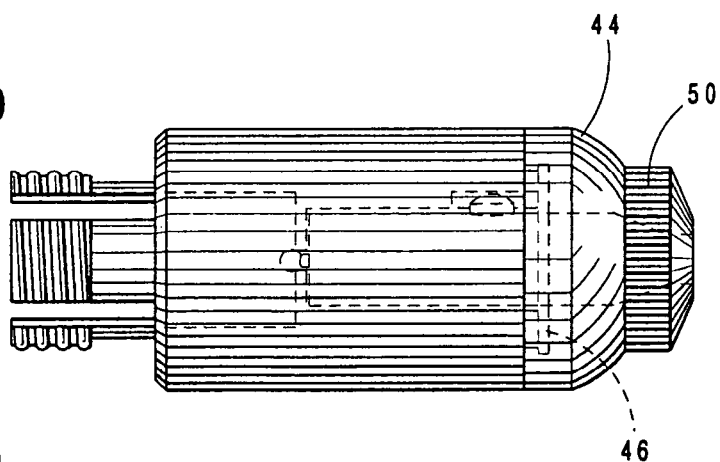
FIG. 10 is a side view of the embodiment shown in FIG. 9 with the shroud or cap mounted upon the end.

In FIGS. 9 and 10 a further embodiment of the invention is shown in which the head or shroud 44 is provided with an internal undercut arrangement 46 which is designed to snap over a circular projection or collar 48 surrounding the mouth of the opening 18 in the main body or housing portion 14 of the laser pointer housing portion 14 of the invention. The interengagement or interaction between the undercut recess 46 in the shroud 42 and the lip or collar 48 on the main body portion 14 is sufficiently tight or intimate to retain the shroud on the main body portion after the two are snapped together, but is sufficiently loose to allow the shroud to rotate upon the forward end 16 of the main housing portion 14 of the laser pointer apparatus of the invention carrying or rotating the laser pointer with it.

Figure 11:
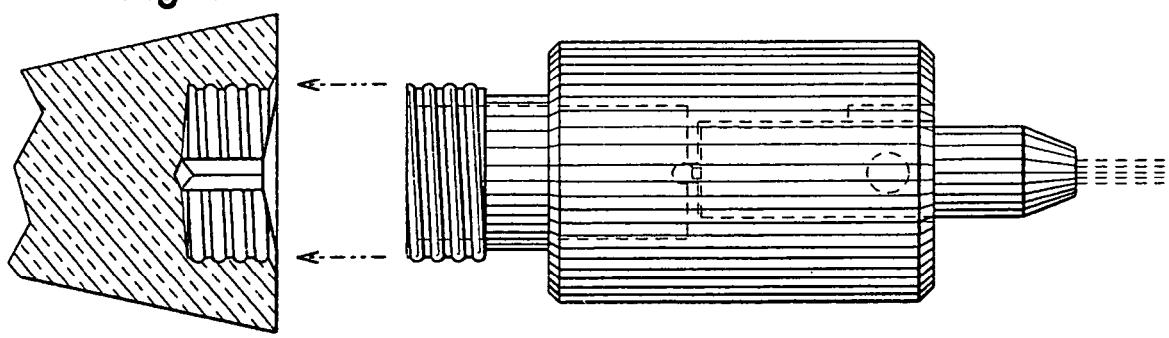
FIG. 11 is a side view similar to FIG. 4, illustrating the placement or mounting of a light fixture alignment guide having a conventional spirally threaded connector being placed or mounted in a bulb socket.

In FIG. 11 the electrical socket engaging prongs 28 of the electrical socket mounting portion of the laser pointer mounting or holder of the invention shown have been combined together to provide a conventional screw threaded or helically threaded arrangement without the slots 27 shown in the prior drawings or FIGS. 1 through 5 and 7 through 10 so that the electrical contact portion has to be screwed or rotated into an electrical socket in the same manner as a conventional light bulb. As noted earlier, some users may prefer the feeling of normal interengagement of the continuous threads into the screw threads of an electrical socket and consequent unquestioned correct alignment of the laser alignment tool with the socket, although, as pointed out, when a number of lighting or luminaire alignments are required at one time in different electrical sockets, being able to slide the contact prongs 28 directly into and out of an electrical socket rather than rotating the prongs in and out will be found to be a substantial time saver. Note that in FIG. 11, as in FIGS. 2 and 4, the laser pointer has been rotated so that its button switch 24 is no longer within notch 34 in the side of the chamber 18 and the laser pointer is activated.

Figure 12:
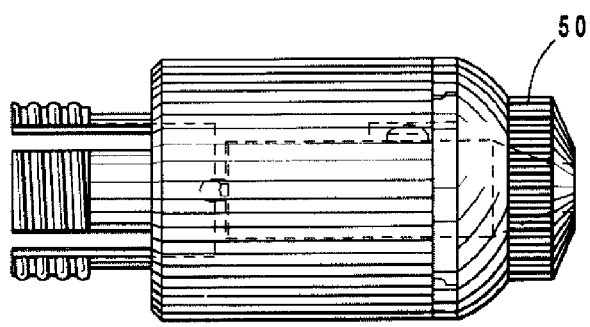
FIG. 12 is a side view similar to FIG. 10, but of a preferred cap arrangement which may be snapped into place as in FIGS. 9 and 10, but has a further ratchet-type one-way movement for activating and deactivating the laser light with a one-way movement of the cap with respect to the casing.
Figure 13:
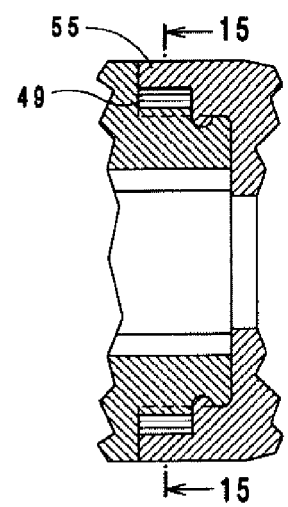
FIG. 13 is a blown-up cross sectional view of the intersection of the cap in FIG. 12 with the body of the laser light plus a ratchet structure formed between the two to provide one-way rotation.

The preferred arrangement shown in FIGS. 9 and 10 wherein the outer shroud or cap 44 is snap mounted or otherwise mounted upon the end of the fitting by snapping over a collar 48 on the body of the fitting is convenient to retain the forward shroud on the fitting over the laser apparatus so that it cannot be easily removed from the laser receptacle. However, the relatively free rotation of the forward shroud allows such shroud to be fairly easily rotated with resultant activation and deactivation of the laser pointer within. This could conceivably present both a power drain when not actually in use and a safety hazard if the laser was accidentally directed into a nearby human or animal's eyes. For example, if the one using the laser to aim a luminarie should accidentally grasp the shroud to aid in removing and try to rotate it counterclockwise in order to remove the apparatus from an electrical socket as is normal in removing and electric bulb from a socket, the laser might be accidentally activated with possible danger to the users eyes and this would be even more likely in the embodiment shown in FIG. 11. Consequently, in a further and still further preferred arrangement, the shroud 44 and main body section of the receptacle are preferably provided with an interactive one-way rotation or twisting relationship between the two so that one active rotational force is required to turn the shroud 44 and activate or deactivate the laser light. One suitable arrangement for accomplishing this is shown in FIGS. 12 and 13 in the form of an anti-rotational arrangement including a ratcheting or other one-way turning arrangement on the inside of, or inboard of the lip 48 combined with a pawl arranged to ride up the slanted surface of a series of slanted members provided on the edge of a wheel arrangement in the form of ratchet members, but not passable beyond the same ratchets on the undercut side thereof. This is commonly referred to as a wheel and pawl arrangement or a ratchet arrangement.

Where the cap is secured upon the holder or casing by the snap action illustrated in FIGS. 9 and 10 and preferably rendered one way in rotation by the arrangement shown in FIGS. 12, 13, 14 and 15 the laser adjustment apparatus becomes essentially self-contained and becomes relatively inexpensive, a throwaway item when the power source is exhausted. As will be evident, other versions of a self-contained alignment adapter may be derived as long as the casing is provided with socket engaging threaded members on one end plus a laser light along the same coordinated axis at the other end.

Figure 14:
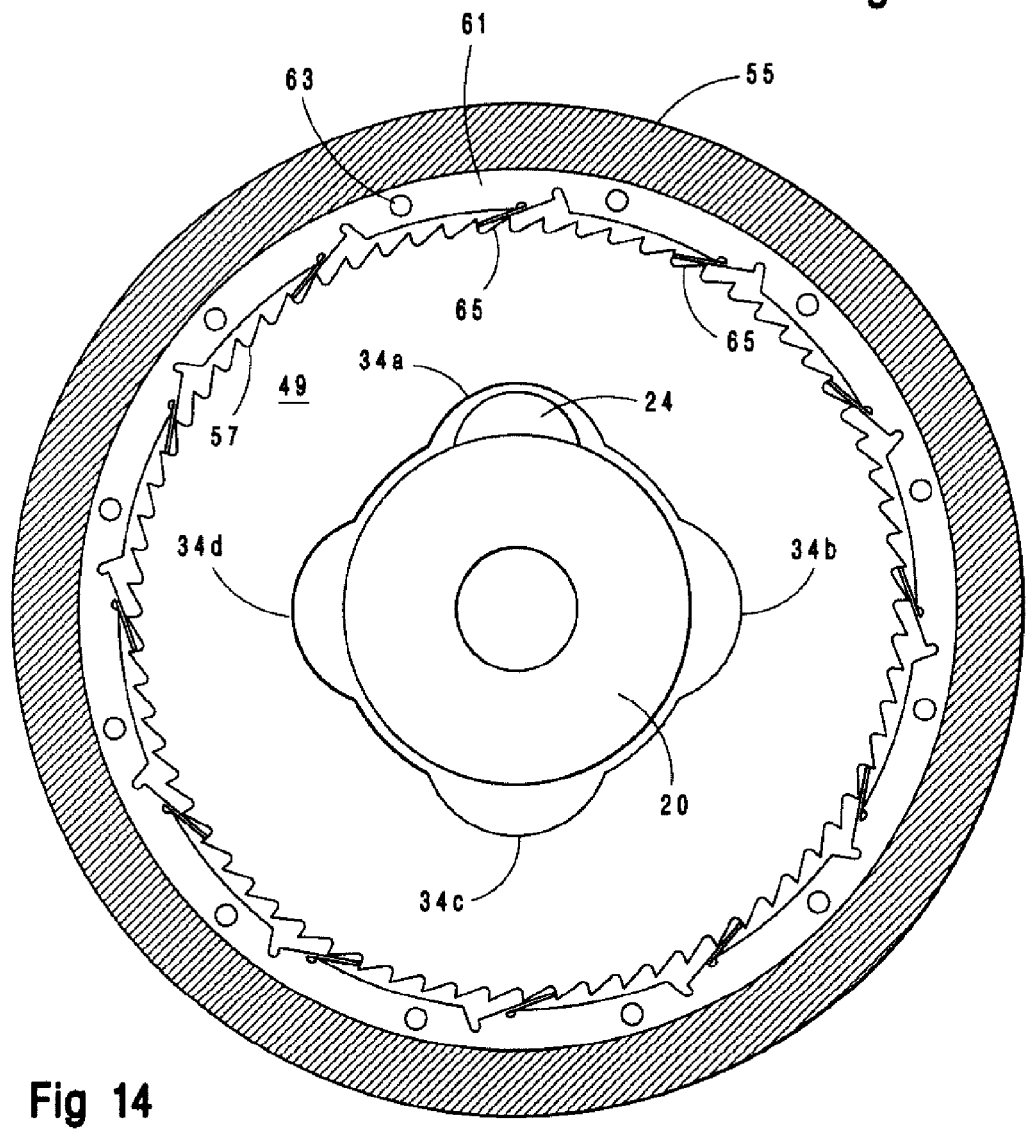
FIG. 14 is an enlarged radial cross section of the mechanism of the ratchet arrangement of FIG. 13 when formed with metal pawls mounted upon a metal frame.
Figure 15:
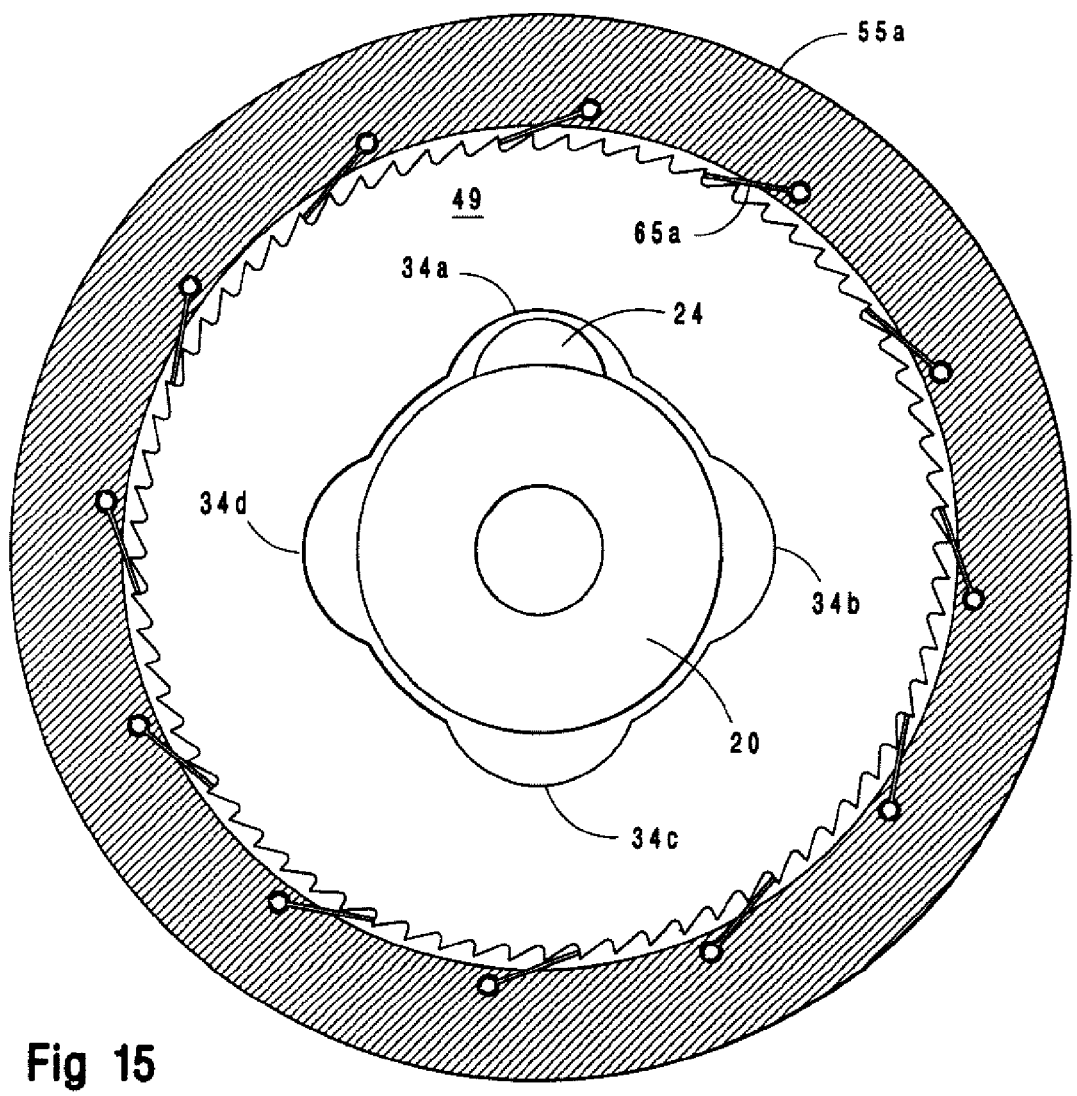
FIG. 15 is a radial cross-section through FIG. 13 along section 14 showing the construction of a simple plastic wheel and pawl or ratchet construction using preferably plastic pawls mounted directly in slots in an extension from the cap or shroud on the end.

The preferred arrangement shown in FIGS. 9 and 10 wherein the outer shroud 44 is snap mounted or otherwise more-or-less permanently mounted upon the end of the fitting by snapping over a collar 48 in the body of the fitting over the laser apparatus so that it cannot be easily removed from the laser receptacle. However, as noted above, the relatively free rotation of the forward shroud allows such shroud to be fairly easily rotated with resultant activation and deactivation of the laser pointer within. This could conceivably present both a power drain when not in use and a safety hazard if the laser was accidentally directed into a nearby human or animal's eyes. Consequently in a still further preferred arrangement, the shroud 44 and main body section 14 of the receptacle are preferably provided with an interactive one-way rotation arrangement which further requires an effective one-way rotation or twisting relationship between the two so that an active rotational force is required to turn the shroud 44 in a clockwise manner to activate or deactivate the laser light. One suitable arrangement for accomplishing this is shown broadly in FIGS. 12 and 13 in the form of an anti-rotational arrangement including a ratchet or cam arrangement 49 on the inside of rearward extension 55 from the lip 46 combined with a movable or snappable series of pawls 51 arranged to ride up the outside slanted surfaces of ratchets 57 of a circular ratchet surface 59 with clockwise movement of the extension 55 from cap or shroud 44, but to catch in the undercut surfaces of the same ratchets on the outside surface of the cam section 49 to oppose a counterclockwise rotation of the shroud 44.

Where the cap is secured upon the holder or casing by the snap action illustrated in FIGS. 9 and 10 and effectively rendered unidirectional in rotation by the arrangement shown in FIGS. 12 and 13 as well as shown in FIGS. 14 and 15 in more detail and described below becomes essentially self contained and, because relatively inexpensive, a throwaway item when the power source, i.e. batteries, become exhausted. As will be evident, other versions of a self contained alignment adapter may be derived or provided as long as the casing is provided with socket engaging threaded members on one end plus a laser light along the same coordinated axis at the other end.

FIG. 14 is an enlarged cross-sectional view of a wheel and pawl arrangement, or ratchet arrangement, in which a metal pawl cage or support 61 is mounted within the extension 55 upon the shroud 44 as shown in FIG. 13. Such support framework is attached to the inside of the extension 55 of the shroud by fastenings 63 and metal pawls 65 are pivoted thereto in any suitable manner allowing the extension 55 of shroud 44 and therefore the entire shroud to turn clockwise as shown in FIG. 14 as the pawls 65 ride up on the gently slanted surfaces of the individual ratchet surfaces, but catch on the undercut surface of the ratchet members 57 if counterclockwise movement is attempted. This ratcheting action very effectively prevents accidental activation of the laser light if an inattentive user attempts to rotate the laser apparatus shroud by the grooved surface 50 counterclockwise to remove it from a luminarie receptacle. Since the one-way rotation feature of this version of the invention will mean that once the laser light is deactivated, the shroud in the embodiment shown in FIGS. 1 to 5 would have to be rotated one full turn before reactivation of the laser light, the inside chamber 18 of the laser mounting in FIG. 14 is provided with four progressive openings 34a, 34b, 34c and 34d into which the activation button switch 24 of the laser pointer light may extend by spring pressure activating the light. Consequently, the shroud need not be turned as far for activation as would otherwise be necessary. It will be evident that the use of particular spacing of the activation openings will depend upon preference plus the diameter of the laser light casing.

In FIG. 15, there is shown a further embodiment of a wheel and pawl, or ratchet arrangement in which either metal, or still more preferably, plastic pawls 65a are embedded at intervals directly in an increased thickness outer collar 55a of the shroud. The only difference between the embodiments of wheel and pawl arrangements shown in FIGS. 14 and 15 is that the arrangement in FIG. 15 does not make use of a separate structural ring 61 to mount the pawls 65a and therefore is less costly but also in many cases more subject to wear and or breakage than the arrangement in FIG. 14. In a further still more economical embodiment, the pawls 65a might not be provided with the enlarged heads 65b to retain them in slots in the collar 55 as shown, but could comprise merely flat blades merely slipped into slots in the enlarged shroud extension 55a and preferably retained in place by some suitable adhesive. The other items shown in FIG. 15 are the same as shown in FIG. 14 and are accordingly identified by the same reference numerals.

While the light alignment aid apparatus as described with reference to FIGS. 1-5 and 7-10 as well as FIGS. 12, 13, 14 and 15 are the preferred embodiments of the device of the invention, such device may be provided in other embodiments, while still falling within the scope of the invention. For example, laser light 20 may be integrally formed with body member 12, or depending upon the manner in which the light 20 is turned off and on, a different arrangement for holding or securing the laser light to the holder, or a different means for activating the device may be provided. In addition, socket engaging prongs 24 may be provided in a non-circular pattern to fit other types of sockets, such as sockets having a rectangular shape used with halogen lights and the like. Other arrangements for securing body member 12 in a bulb socket may also be utilized, such as a normal screw fit shown in FIG. 10, as long as the laser device is properly aligned longitudinally with the bulb socket and thus with the directional light housing so that by aiming the laser light the directional housing is aligned.

It is also possible to provide a laser light which is activated by the normal electrical current which is supplied to the principal lighting device. In such case, a suitable circuit for operating the laser light would be provided in the aligning device, and preferably, a normal screw in electrical contact will be supplied on the end with a normal central contact as well. Split outside contact threads would preferably not be used in such instance to avoid possible arching as the threads slide over the light fixture threads.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention.

I claim:

1. A light fixture alignment apparatus comprising:
   (a) a laser light source;
   (b) a non-conductive housing, said housing having an opening in one end for reception of said laser light source, and at least two flexible extension members on its other end sized and dimensioned to fit into a bulb socket of a light fixture to be aligned;
   (c) the opening for holding a laser light source and the flexible members being aligned along a coordinate axis with each other at opposite ends of the housing,
   (d) means for activating said laser light source,
   (e) and wherein when said flexible members are inserted into a bulb socket and the laser light source is activated, said laser light illuminates the aiming point of the bulb socket such that by moving the bulb socket the proper alignment position of said bulb socket can be attained by observing the impingement of the laser light illumination upon an external environment of the light fixture.

2. The light fixture alignment apparatus of claim 1 wherein said laser light source has a button style switch on its outer surface for operating the laser light, and additionally comprising a detent means in the opening of said housing positioned to receive said switch when the laser light source is inserted in said opening, and wherein said laser light source is rotatably mounted in said opening such that rotation of the laser light source in the opening causes the switch to move out of said detent and press against the walls of said opening, thereby activating the switch.

3. The light fixture alignment apparatus of claim 1 wherein said housing includes four flexible members arranged such that when inserted in a bulb socket said member are moved inwardly towards one another while exerting outward pressure against the sides of the bulb socket sufficient to at least temporarily retain said members within the bulb socket.

4. The light fixture alignment apparatus of claim 3 wherein said flexible members have matching male threads on their outer surface.

5. The light fixture alignment apparatus of claim 4 wherein said flexible members are made from a non-conductive material.

6. The holder of claim 5 wherein the prong members are threaded on the exterior to mesh with the light fixture socket.

7. The light fixture alignment apparatus of claim 1 wherein a retentive cap is provided on the end of the non-conductive housing adapted to retain the laser light source within the housing when affixed thereto with a laser light opening in line with the light source and is retentive to the laser light source such that the light source can be rotated within the housing by rotating the cap.

8. The light fixture alignment apparatus of claim 7 wherein the retentive cap is maintained upon the end of the non-conductive housing by a snap arrangement.

9. The light fixture alignment apparatus additionally including a retentive end fitting over as in claim 8 where the retentive cap is provided with a one way rotational movement with respect to the housing by a ratcheting-type arrangement between the cap and the housing.

10. A method for quickly aligning a household or commercial light fixture, the method comprising the steps of:
providing a laser alignment tool for determining whether a light fixture is aimed in a desired direction;
securing said laser alignment tool in a bulb socket for a light fixture, with a laser light emitted by said tool aligned with the longitudinal axis of said bulb socket by means of a fixed fitting adapted for interengagement with the threads of the bulb socket;
activating the laser light; and
adjusting the position of said light fixture so that the laser light impinges upon a central portion of an area of the surrounding environment it is desired to illuminate.

11. The method of claim 10 additionally comprising the steps of:
deactivating said laser light;
securing said fixture in the position determined by using the laser alignment tool;
inserting a lamp in said bulb socket, and
activating the lamp to illuminate the desired area of the environment.

12. The method of claim 10 wherein the threads of the tool slip into engagement with the threads of the bulb socket.

13. The method of claim 10 wherein the threads of the tool are threaded into the threads of the bulb socket.

14. An apparatus in accordance with claim 13 wherein the extension for inserting and temporarily securing in a light socket is threaded to match the threads of the light socket.

15. An apparatus for aligning directional lights by use of a laser light comprising:
(a) a fitting having a first and second end;
(b) the first end having a holder for mounting a laser light pointing means;
(c) the second end having an extension in the form of an adapter for inserting into and temporarily securing the holder in a light socket;
(d) the extension and holder being aligned along the same axis of orientation.

16. An apparatus in accordance with claim 15 wherein the threaded extension is circumferentially segmented and at least somewhat flexible in order to allow it to be forced into a light socket without rotation within the threads of such light socket.

17. A laser light apparatus for aligning directional lighting in accordance with claim 16 wherein the laser light is a self contained unit and the extension is threaded for securing in the light socket.

18. A laser type alignment apparatus for aligning directional lighting comprising:
(a) a fitting having a laser light at one end,
(b) an extension adapted for insertion into and temporary containment within a light socket at the other end,
(c) the laser light and the extension being oppositely aligned along the same axis.

19. A laser light apparatus for aligning directional lighting in accordance with claim 18 wherein the extension is longitudinally segmented and at least somewhat flexible to allow longitudinal insertion into the light socket without rotational movement.

20. A laser light apparatus for aligning directional lighting in accordance with claim 18 wherein the laser light is substantially permanently mounted within a separate holder.

* * * * *